2 Sheets—Sheet 1.

E. H. THOMPSON,
Assignor to W. A. AMBERG.
Temporary Binder.

No. 8,981. Reissued Nov. 25, 1879.

Witnesses:
H. Dietrich
Jno. H. Stockman

Inventor
Edward H. Thompson
Per Wm. H. Bond
Attorneys.

N. PETERS, PHOTO-LITHOGRAPHER, WASHINGTON, D. C.

2 Sheets—Sheet 2.

E. H. THOMPSON,
Assignor to W. A. AMBERG.
Temporary Binder.

No. 8,981. Reissued Nov. 25, 1879.

Witnesses:
P. C. Dieterich
Jno. H. Stockman

Inventor
Edward H. Thompson
Per West & Bond Attorneys.

N. PETERS, PHOTO-LITHOGRAPHER, WASHINGTON, D. C.

UNITED STATES PATENT OFFICE.

EDWARD H. THOMPSON, OF WASHINGTON, DISTRICT OF COLUMBIA, ASSIGNOR TO WILLIAM A. AMBERG.

IMPROVEMENT IN TEMPORARY BINDERS.

Specification forming part of Letters Patent No. 118,757, dated September 5, 1871; Reissue No. 8,072, dated February 5, 1878; Reissue No. 8,981, dated November 25, 1879; application filed October 6, 1879.

*To all whom it may concern:*

Be it known that I, EDWARD H. THOMPSON, of the city and county of Washington, and District of Columbia, have invented certain new and useful Improvements in Files and Indexes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
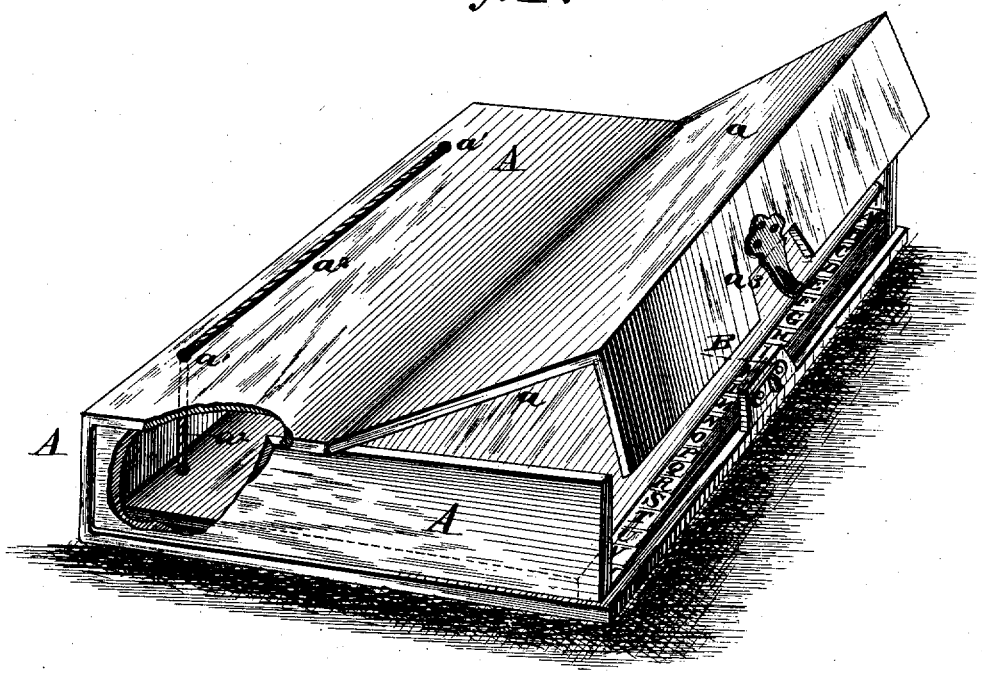
Figure 2:
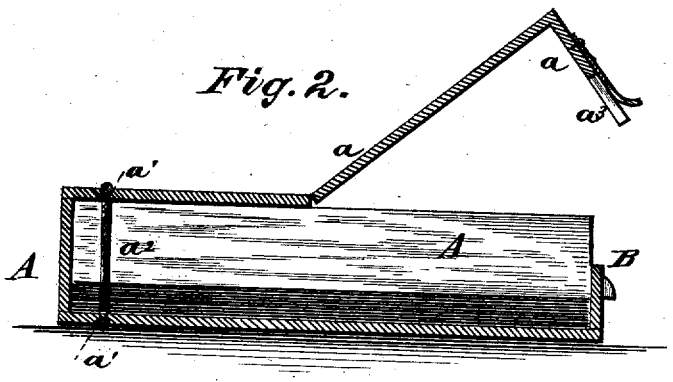
Figure 3:
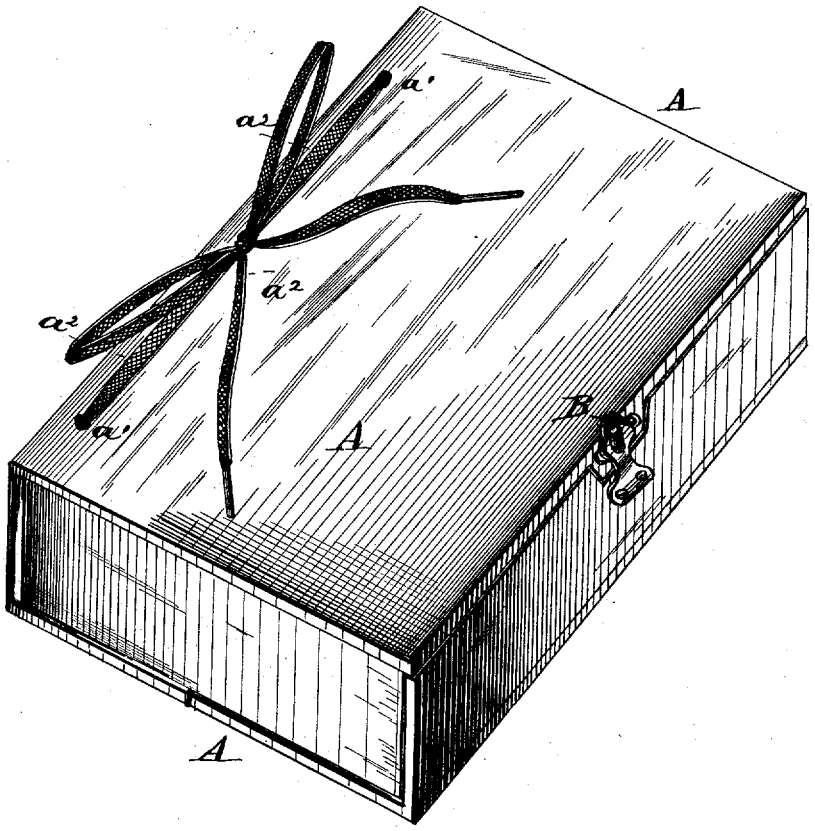

Figure 1 is a perspective view; Fig. 2, a vertical cross-section; and Fig. 3 is a perspective view of the case inverted, showing the bottom and the manner of fastening and unfastening the index-holder.

This invention has reference to an improved file and index for letters, &c.; and it comprises various combinations of devices, of which the following are the principal, viz: a receptacle having apertures near its rear end or back, through which is introduced flexible or other suitable material for holding the index-leaves properly in place within the said receptacle, and whereby the said leaves may be so arranged with reference to each other as that a space of any required size between them can be created for the proper accommodation of the quantity of letters, &c., to be inserted between them for filing; also, a hinged door or lid arranged to open sidewise of the index-leaves, as shown in the drawings, so as to expose the faces of the index-leaves and of the filed matter more or less; also, a post or guard, which assists in properly retaining the letters, &c., within the leaves of the index, substantially as hereinafter more fully described and claimed.

To enable others to manufacture and use my invention, I have represented in the accompanying drawings, and will proceed to describe, a file embodying all my combinations in the best form devised by me at the time of making application for my original patent.

In the annexed drawings, A represents a receptacle or case, made, preferably, of a rectangular form, and supplied with a door or lid, *a*, which is hinged or attached to the said case at the end of its horizontal portion, and supplied at the extremity of its vertical portion with a clasp, which fits over a projection secured to the base of the guard B of the case A. This case is also constructed with openings $a'$ $a'$, both in its top and bottom, and near its rear end or back, for the reception and passage of the tape $a^2$, or other suitable means for holding the series of index-leaves, designated by the letters of the alphabet, within the said case, the said fastening or tape $a^2$ being made to pass through apertures in the said leaves, and tied at its ends or otherwise secured on the lower side of the case just referred to, and whereby the said leaves may be secured in place with the capacity of separating or expanding more or less, so as to permit of a space between each two of them being created of such size as to accommodate or suit the quantity of letters to be inserted between them for filing.

The series of index-leaves capable of separating or expanding I call an "expanding index," and the tape or other suitable means for holding the index-leaves I call the "index-holder."

B is the post or guard above referred to, which is fastened at its lower extremity to the bottom of the case A, or constructed with the latter, and for the reception of which, when the lid *a* is closed, a recess or opening, $a^3$, is cut in the front part of the said cover or lid *a*. (See drawings.) This guard prevents the letters inserted between the index-leaves from coming in contact with the lower edge of the cover *a*, as it is so located that its inner surface, against which the said letters rest at their outer ends or edges, is brought in the same plane as that of the inner surface of the vertical or front part of the said cover, thereby preventing them from projecting beyond the same and the said cover, accomplishing the result above stated.

The case A forms a boundary for the index-leaves, which nearly or quite fill such boundary, and thereby aids in keeping the letters, &c., in place.

Having thus described my invention, what I claim, and desire to secure by Letters Patent, is—

1. The case A, having a lid or cover, *a*, opening sidewise, and a guard or post, in combination with boundary-filling expansible index-leaves, arranged to receive and hold loosely-inserted matter by the case when closed, substantially as specified.

2. The case, retaining lid or cover, and guard, in combination with an index-holder holding the index-leaves in place, substantially as described.

3. The combination of a variably-expanding index with a removable index-holder, upon which its leaves are free to rise and fall, and a close-covered case fitting around it to assist in retaining matter within the index-leaves in place, substantially as specified.

4. The combination, substantially as before set forth, of the case, the expanding index, the index-holder, the guard or post, and the lid or cover fitted to open at the side of the expanding index, substantially as set forth.

5. The combination, substantially as before set forth, of the case, the index-holder, which holds the index-leaves with the capacity of expanding, and the expanding index, constructed with apertures for the passage of the index-holder, substantially as specified.

6. The combination, substantially as before set forth, of the case, the index-holder, the expanding index, and the lid or cover fitted to open at the side of the expanding index, substantially as described.

In testimony that I claim the foregoing as my own I have hereunto set my hand in the presence of two witnesses.

EDWARD H. THOMPSON.

Witnesses:
WM. B. UPPERMAN,
P. C. DIETERICH.